Dec. 12, 1950     W. B. STODDARD, JR     2,533,533
METHOD OF FORMING A STRONGLY
ADHERENT ELECTRODEPOSIT

Filed Jan. 8, 1946     4 Sheets-Sheet 1

Inventor
William B. Stoddard Jr.
By Frederick G. L. Boyer
Attorney

Dec. 12, 1950  W. B. STODDARD, JR  2,533,533
METHOD OF FORMING A STRONGLY
ADHERENT ELECTRODEPOSIT
Filed Jan. 8, 1946  4 Sheets-Sheet 2

INVENTOR.
William B. Stoddard, Jr.
BY
Frederick G. R. Boyer

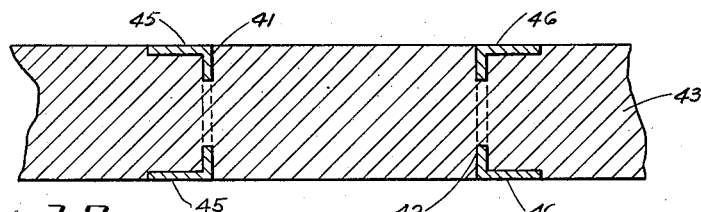
_Fig. 12_
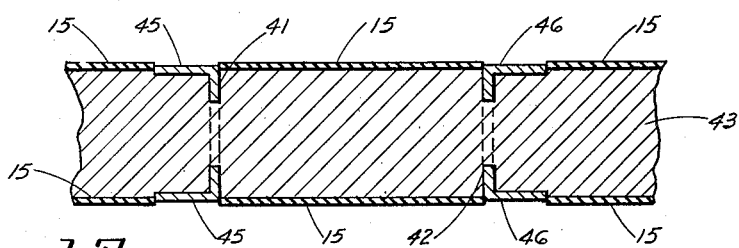
_Fig. 13_
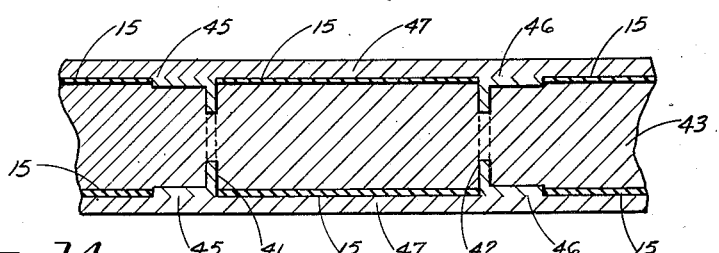
_Fig. 14_
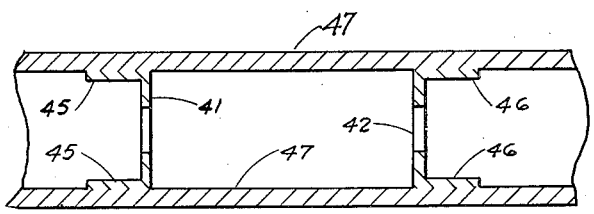
_Fig. 15_
INVENTOR.
William B. Stoddard, jr.
BY
Frederick G. L. Boyer Dec. 12, 1950
W. B. STODDARD, JR
2,533,533
METHOD OF FORMING A STRONGLY ADHERENT ELECTRODEPOSIT
Filed Jan. 8, 1946
4 Sheets-Sheet 4

INVENTOR.
William B. Stoddard, Jr.
BY
Frederick G. L. Boyer

Patented Dec. 12, 1950

2,533,533

UNITED STATES PATENT OFFICE 2,533,533

METHOD OF FORMING A STRONGLY ADHERENT ELECTRODEPOSIT

William B. Stoddard, Jr., Hamilton, Ohio, assignor to The Champion Paper and Fibre Company, Hamilton, Ohio, a corporation of Ohio Application January 8, 1946, Serial No. 639,870

10 Claims. (Cl. 204—16)

This invention relates to the electrodeposition of metals onto a metallic base and is herein more particularly described as applied to the electrodeposition of nickel onto surfaces composed partly of nickel and partly of solder. It involves the preparation of these surfaces in a manner such that the poisoning effect of the solder on adjacent parts of the base metal surface is prevented, and the bond between the electrodeposit and the base metal has strength comparable to that of the base metal itself. It has especial value where the electrodeposited metal is not to form a mere decorative or protective coating, but instead where it and the base metal are to constitute parts of an integral mechanical structure. It has a particular utility in cases where a body of solder or the like, constituting a material part of the surface onto which a layer of metal is electrodeposited, is to be subsequently removed by fusion or otherwise to leave an integral structure composed in part of the base metal and in part of the electrodeposited metal.

In the electrodeposition of metals such as nickel, it is known that the presence of solder on or adjacent to the surface onto which the deposit is to be made, poisons the surface, preventing a tightly adherent deposit in the vicinity of the solder. It has consequently been common practice in nickel plating objects having soldered joints or the like, to first flash plate the object with copper in a cyanide bath; then, after base metal and solder were covered with a coating of copper, to carry out the nickel plating operation. This expedient produced a plate of substantially uniform appearance over base metal and solder, and normally served to prevent spontaneous peeling of the nickel plate from the solder or the base metal and was generally considered adequate for the provision of decorative and protective coatings. However, in cases where the deposit is required to be strongly adherent, as where the deposited metal is to form a stress carrying part of a mechanical structure of which the base metal forms another part and stress must be transmitted from one to the other, this method is found to give completely inadequate adherence. No matter how perfect the electrolytic bond between the base metal and the copper and between the copper and the electrodeposit thereon, the bond can be no stronger than the copper link which, when it joins metals such as steel and nickel, possesses but a fraction of the strength of the metals joined. In practice, however, the strength of the bond between the base metal and the electrodeposit has been found to be much less than that of the copper link, indicating that the presence of solder has poisoned the base metal against the deposit of copper, as against the deposit of other metals. Further, this poisoning effect of the solder appears to become more serious and harder to combat as the surface area occupied by solder becomes larger in proportion to the entire area of the surface onto which the electrodeposit is to be made.

I have now discovered that solder can be prevented from poisoning adjacent nickel surfaces if, instead of attempting to cover or otherwise to protect the surface of the nickel per se, the surface of the solder, rather than that of the nickel, is protected by completely covering it with a suitable film during the time prior to the beginning of electrodeposition thereon during which poisoning otherwise takes place, while the surface of the nickel is free from anything which might interfere with strong adherence between it and metal electrodeposited thereon. Since it is generally desired to electrodeposit metal over both solder and nickel surfaces, the film formed over the solder must be electrically conducting, when submerged in the plating bath, to the extent that it does not materially interfere with the electrodeposition of metal over surfaces covered thereby. In order to give the best results, the film should be substantially continuous and impervious and should substantially completely cover the surface of the solder, should be resistant to solution in water, and should resist solution in, and penetration or removal by, the plating solution, so that it forms a physical and chemical barrier separating the solder from the plating solution.

I have further discovered that such a film can be formed on and confined to the surface of the solder by use of electro-chemical reactions which involve metals present only in the solder. The particular reaction which I have found most effective in the formation of such films on solder is anodic treatment in a concentrated solution of sulfuric and phosphoric acids.

I have additionally discovered that when surfaces composed partly of nickel and partly of solder are given this anodic treatment to form a protective film over the surface of the solder, no further treatment of the nickel surface is required to so prepare it for the reception of a deposit of nickel that the bond between the base metal and the deposit will be substantially as strong as the metal itself.

This method of covering the surface of the solder with an electrically conducting protective film and simultaneously preparing the nickel surface to receive a strongly adherent electrodeposit may be carried out as follows: The combined nickel and solder surface may first, if necessary, be cleaned as for example by treatment as cathode in a usual alkaline cleaner. It is then immersed and made the anode in a concentrated solution of sulfuric and phosphoric acids, or of sulfuric acid and other tribasic acid, at a temperature advantageously between about 30 and 45 degrees C., though the process appears to be operable over a considerably wider temperature range. The cathode may be of any suitable material, e. g. lead, which is not too seriously attacked by the acid bath. When the film over the solder has reached the required thickness, the current is turned off and the treated surface is removed from the bath and thoroughly rinsed with water. This rinsing appears readily to dissolve or otherwise remove any film or deposit which the electrolytic action may have formed on the nickel parts of the surface, but has no apparent effect on the film formed on the solder parts of the surface. The treated part is then made the cathode in a nickel plating bath and deposition is carried out in the usual manner. Since the film is only effective for a limited time in the plating bath, it is desirable to avoid unnecessary exposure to the plating bath with the current off. Also, solder flux inclusions and foreign matter accessible from the surface may cause non-adherence and should be carefully avoided.

If the preparation has been carefully carried out in the manner described, it is found, contrary to the usual experience with electrodeposition following anodic treatment of nickel, that the electrodeposit adheres to the nickel base with strength substantially equal to that of the nickel itself. This degree of adhesion appears to extend over the entire area of the nickel surface up to, or substantially up to, its junction with the solder surface, thus demonstrating the effectiveness of this method not only in preventing the poisoning effect of the solder on the nickel parts of the surface but also in preparing the nickel surface for the reception of a strongly adherent electrodeposit.

It is not to be understood that the film over the surface of the solder prevents adhesion of the electrodeposit to the solder, as the adherence here appears to meet the usual commercial requirements for adherence of electroplate. This is, however, of little interest in cases where this process is used to build up a mechanical structure, since in these cases the solder is frequently removed entirely and, if not, the strength of the solder itself is such a small fraction of that of the nickel that the strength of the structure is almost solely dependent on the strength of the bond between the nickel deposit and the nickel base, and is practically independent of the bond which is formed between the nickel deposit and the solder base.

As already noted, the preferred acid bath is a concentrated solution of sulfuric and phosphoric acids. Bath compositions are herein defined in proportions by volume of sulfuric acid 1.83 specific gravity, phosphoric acid of 1.689 specific gravity, and water. The proportions of these constituents do not appear critical and may vary considerably. Water is advantageously not much over sixty per cent and may be as little as ten per cent or less. Phosphoric acid should be present in appreciable amount say one per cent or more. The ratio of phosphoric to sulfuric acid is advantageously from one-third to one-half but may vary from less than one-tenth to more than one. A generally satisfactory solution, using acids of the strengths already noted, may be made up of 60 parts of sulfuric acid, 20 parts of phosphoric acid, and 20 parts of water, by volume.

Polarization phenomena naturally cause a material difference between the current densities on the solder and non-solder parts of the surface. The only current density which can be determined is, therefore, the average current density over the entire area, and when, as is frequently the case, solder forms a material portion of the surface being treated, this average is meaningless unless the proportion of the area covered by solder and the effects of polarization on both parts of the surface are definitely known. For this reason it is generally more satisfactory to maintain the voltage, rather than the current density, at a fixed value, for example about 7.5 volts. While voltages materially higher than this value may be used, I have in general secured more satisfactory results at about the voltage named. At lower voltages, as from about 4 to 6 volts, the current flow frequently appears to be unstable. Such lower voltages should, therefore, be used with caution if at all. I have further found it advantageous in many cases to follow this with treatment at a reduced voltage, e. g. 3 volts, for a short time, since at this voltage a reddish brown film is formed on the surface of the nickel, where it is in condition to receive an adherent electrodeposit, and this constitutes a convenient visual indicator showing satisfactory preparation. A strong odor of ozone has also been observed during successful operation of the anodizing step in the process.

So far the process has been described as applied to the electrodeposition of nickel onto surfaces composed in part of nickel and in part of solder. I have found, however, that it is more broadly useful. The presence of solder does not appear to be necessary to the effectiveness of this treatment in securing strong adhesion of nickel deposits to a nickel base. Further, the process as described can be successfully used on a metallic base of either steel or nickel, in the presence of solder, and will serve to prevent the usual poisoning effect of the solder and will at the same time prepare the base metal for the reception of an electrodeposit of iron or nickel which will then adhere to the base metal with strength substantially equal to that of the metals themselves. With steel, however, the anodizing solutions are advantageously less dilute than can be used with nickel.

In this connection, the term "steel" as herein used includes carbon steels in all usual ranges down to and including the extremely low carbon steels sometimes referred to as ingot iron. It also includes the so-called low alloy steels such as those containing nickel, chrome-nickel, chrome-nickel-molybdenum, etc. in which none of the alloying elements is present in excess of three to five per cent. It specifically does not include the high alloy steels commonly known as "stainless steel," such as for example the 18-8 steel of commerce. The process as defined has been found to operate successfully on the types of steel included in this definition and to be unsatisfactory as a final preparation for the reception of an adherent electro-deposit on the types of steel herein excluded from the meaning of the term. The term "iron" is herein used with reference to electrolytic iron as distinguished from the usual commercial form of iron and steel.

The term "nickel" is to be understood as referring not only to pure nickel but also to nickel containing minor percentages of cobalt—an element which is commonly present to a greater or lesser extent in commercial nickel anodes.

The term "solder" as herein used includes metals and alloys consisting largely of lead and/or tin. Pure lead alone is operative, as is also pure tin. In many respects the most satisfactory alloy from the standpoint of this process is the eutectic alloy composed of approximately 68 parts tin and 32 parts lead, though alloys of widely varying proportions can be successfully handled by the process hereinbefore described.

The rinsing step described as following the anodizing is generally recommended though not always necessary. When using anodizing solutions containing phosphoric acid, it is desirable to rinse with water to keep the phosphate radical out of the plating bath. In case of nickel plating baths containing boric acid, any boric acid carried over from an anodizing bath containing boric instead of phosphoric acid, is harmless. In such case no rinse appears to be necessary, agitation in the plating bath apparently having sufficient solvent or rinsing action to remove any harmful film from the surface of the nickel before electrodeposition is begun, if any such film has in fact been left by the anodizing step.

The invention will be made more clear by the description of illustrative embodiments with reference to the accompanying drawings, in which.

Figure 5:
Figure 6:
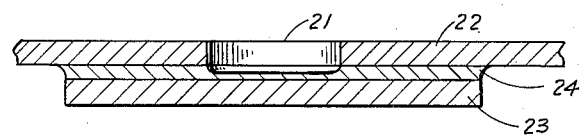
Figure 7:
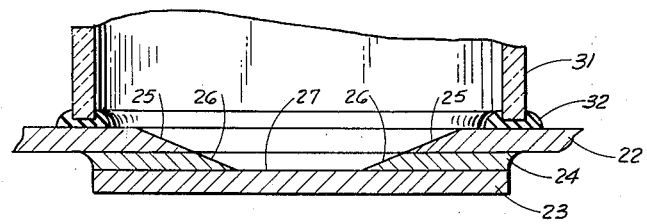
Figure 8:
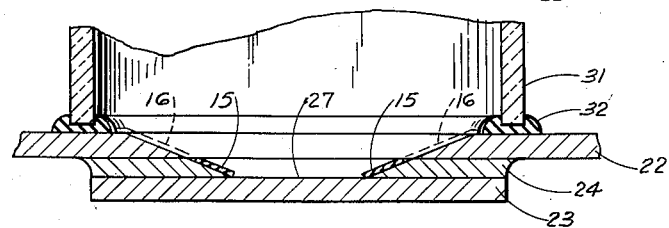
Figure 9:
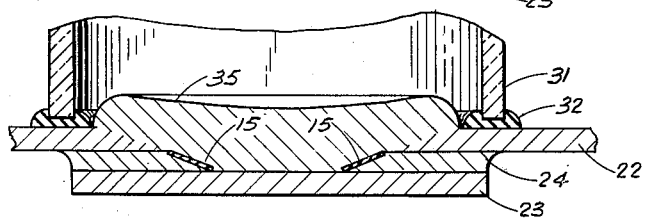
Figure 10:
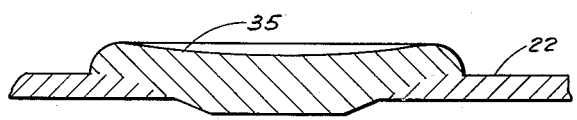
Figure 11:

Figs. 5 to 11 inclusive, show the adaptation of the process to the patching of a hole in sheet metal as described in Example 2, Fig. 5 being a cross section of a part of a metal sheet at a hole. Fig. 6 is a similar sectional view after a stainless steel sheet has been soldered over the hole. Fig. 7 shows the same after mechanical preparation and the cementing of the electrolytic cell in place. Fig. 8 shows the same after the anodic treatment. Fig. 9 shows the same after filling of the hole with nickel. Fig. 10 shows the same after removal of the stainless steel and solder. Fig. 11 shows the finished patch after the electrodeposited nickel has been dressed down to the level of the sheet.

Figs. 12 to 15 inclusive, show the adaptation of the process to formation of a structure as described in Example 3. Fig. 12 is a fragmentary cross sectional view through the two sheet metal struts embedded in lead. Fig. 13 shows the same after anodic treatment. Fig. 14 shows the same after deposition of iron over the anodically treated surfaces. Fig. 15 shows the same after the melting out of the lead.

Figure 16:
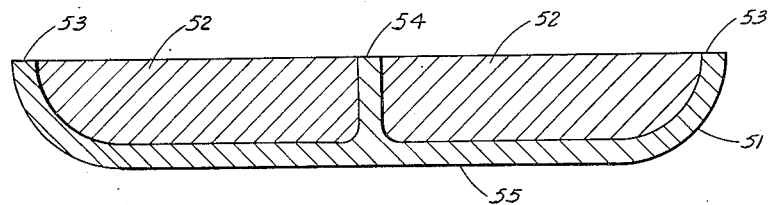
Figure 17:
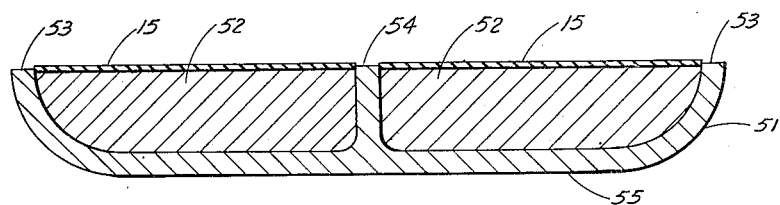
Figure 18:
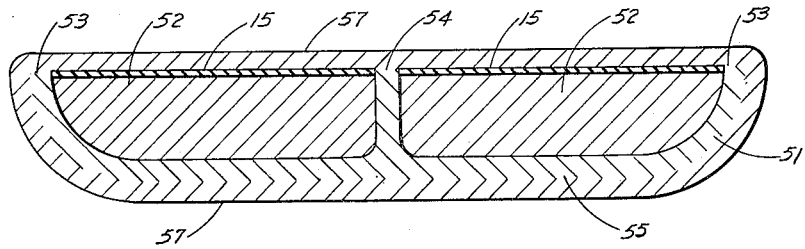
Figure 19:
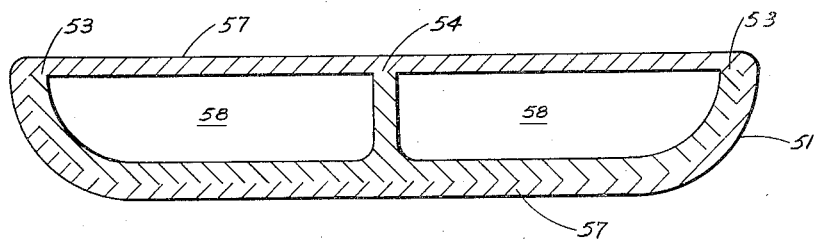

Figs. 16 to 19 inclusive, show the adaptation of the process to the formation of a structure as described in Example 4. Fig. 16 is a cross sectional view of the solder-filled base before treatment. Fig. 17 shows the same after anodic treatment. Fig. 18 shows the same after the deposition of nickel over the anodically-treated surface. Fig. 19 shows the completed structure as it appears after melting out the solder.

Figure 1:
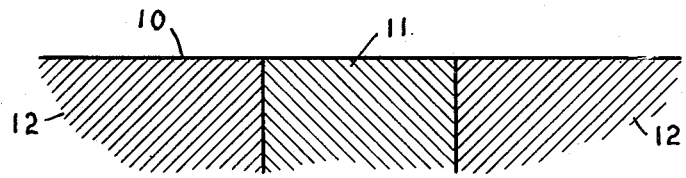
Fig. 1 is a fragmentary view in cross section, illustrating a portion of the surface of a metallic body which is composed partly of solder and is required to receive an adherent electrodeposit.

Referring first to Fig. 1, the smooth metallic surface 10 is partly composed of solder 11 and partly of another metal 12 which may for purposes of illustration be considered to be nickel. In order to prevent the presence of the solder 11 from poisoning the adjacent portions of the surface 10, to a greater or lesser distance from the solder 11, against the reception of an adherent deposit of nickel, the exposed surface of the solder is covered by a film 15 (Fig. 2) advantageously by anodic action in a bath of concentrated sulphuric and phosphoric acids in the manner already described. This film (the thickness of which is greatly exaggerated in the drawing) should as nearly as possible completely cover the solder and be sufficiently inert and impervious to prevent the solutions used from contacting the solder prior to the formation of the electrodeposit thereover. Conversely, the film should, advantageously, cover only so much of the surface as is composed of solder since, if it covers more, the area of strong adherence is correspondingly reduced, and if used in a stress-carrying structure, points of stress concentration which may lead to failure are introduced. This film, in order that the electrodeposit may cover the entire composite nickel-solder surface, must be electrically conducting to an extent that it does not appreciably interfere with the electrolytic deposition of nickel thereover.

After the solder is covered by film 15 the surface is ready to be placed in the plating bath and to receive the required electrodeposit. It is, however, in some cases convenient to conclude anodic formation of the film with anodic treatment at a reduced voltage, as already described, in order that a visible reddish brown film may be formed over the nickel surface to serve as a visual indication that the surface is prepared to receive the electrodeposit. This film is illustrated at 16 in Fig. 3, by dotted lines, to indicate the fact that it is not a continuous impervious covering as is film 15 but that it is apparently discontinuous or at least so non-adherent or evanescent that it apparently disappears in the rinse or in the plating solution itself before deposition begins.

Figure 2:
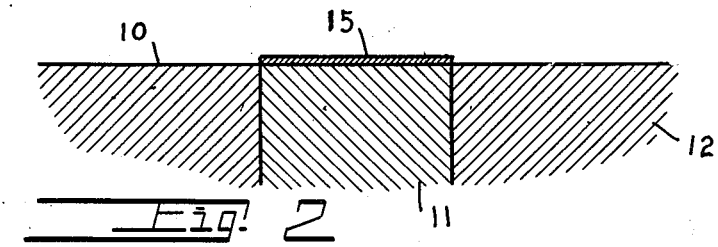
Fig. 2 is a similar view showing the same portion of the surface after the formation of a film over the surface of the solder.
Figure 3:
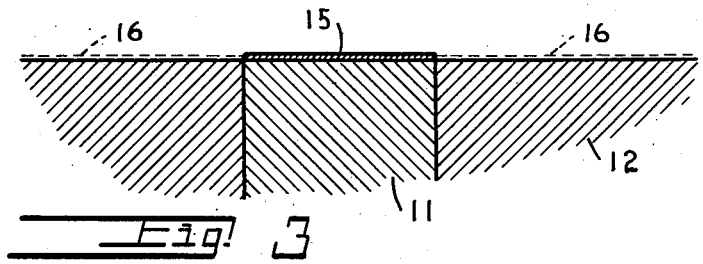
Fig. 3 is a similar view illustrating in dotted lines the reddish brown film which may be formed, if desired, over the surface of the nickel, by brief anodization at reduced voltage, in order to form a visual indication that the preparation for electrodeposition has been completed.
Figure 4:
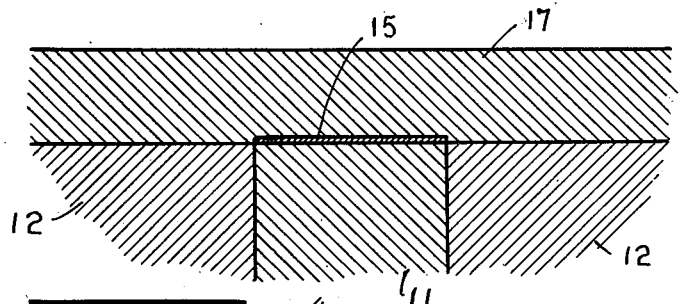
Fig. 4 is a similar view showing the same portion of the surface after the electrodeposition of metal thereover.

The body with the surface prepared as shown in Fig. 2, or with the additional film 16 as shown in Fig. 3, is then introduced into the plating bath, as described, and covered with an electrolytic deposit 17 (Fig. 4) of nickel of any specified thickness. As shown in the figure there is no sign of any film 16 between the nickel base 12 and the nickel deposit 17, regardless of whether or not it was formed on the surface prior to electrodeposition. The adherence of the deposit 17 to the base 12 is, if the process has been carefully carried out as described, of a strength approximately equal to that of the nickel itself, so that any stress may be transmitted through the bond 12 and 17 which could safely be transmitted by the weaker of the metals 12 and 17 (if not of identical strength). As indicated in the figure, however, the layer 15 remains between the solder 11 and the electrodeposit 17 in the finished structure. In spite of this face the adhesion between the deposit 17 and the solder portion 11 of the base appears to be as great as that usually required in electroplating operations. In cases, however, where a stress-carrying structure is being produced, the solder itself has, relative to the nickel, so little strength that neither its strength nor the strength of bond between it and deposit 17 is considered. This is particularly true in those cases where the solder 11 is merely a form for giving shape to a body electroformed thereover, and is subsequently removed by fusion.

A clear understanding of the process will be facilitated by the following examples of the successful use thereof:

Example 1

A surface, some 180 square inches in extent, of electroformed nickel sheet having a tensile strength of over 100,000 pounds per square inch, was flush with a surface of solder, composed of lead and tin in substantially eutectic proportions, and was so formed that the line of contact between nickel and solder was approximately 150 inches in length. Without any preliminary treatment this nickel and solder surface was treated anodically, in a solution of 60 parts sulfuric acid, 20 parts phosphoric acid, and 20 parts of water maintained at a temperature of about 35° C. The applied potential was 7½ volts for the first three minutes, after which it was reduced to 3 volts and the treatment continued for three more minutes. By this time the nickel parts of the surface could be seen to be covered with a reddish brown film which was, however, removed in the next step—the rinsing of the surface for 3½ minutes in running water. Immediately thereafter nickel was electrodeposited on the surface from a plating bath and under conditions as nearly as possible like those used in electroforming the nickel sheet on which the deposit was being made. This deposition was continued until the deposit reached a thickness somewhat greater than that of the nickel sheet forming the base for the deposit. The conductivity of the film formed over the surface of the solder by the anodic treatment is shown by the substantial quality of thickness of the nickel deposit over the solder with that on the nickel base. The efficacy of the film as a seal over the surface of the solder is shown by tests of the strength of the bond between the nickel deposit and the nickel base. These tests, carried out after removal of the solder, showed the bond between the electrodeposit and the nickel base to have substantially the same strength as the base sheet itself. No evidence of the usual poisoning effect of the solder on the adherence of the deposit to adjacent parts of the nickel surface was detected.

Example 2

In this case the invention was adapted to a process of patching holes in sheets or strips of nickel and made use of the hereinbefore stated fact that the anodic method of forming a film over the surface of the solder does not leave stainless steel in the presence of solder in a condition to receive an adherent electrodeposit of iron or nickel. It was desired to patch a hole 21 about one inch in diameter in a sheet 22 of nickel about 0.010 inch thick. A piece of stainless steel 23 (18-8) was soldered by means of solder 24 onto one side of the nickel sheet covering the hole. The edges of the hole were bevelled as shown at 25 and the solder was cleaned off of the stainless steel. This process resulted in a bevelled annular surface of nickel 25 and a bevelled annular surface of solder 26 surrounding a flat circular surface 27 of stainless steel and surrounded by the flat surface of the nickel sheet 22. A small electrolytic cell the lower part of which is indicated at 31 with an open bottom was set up over the prepared hole and cemented in place as indicated at 32. A solution of 60 parts sulfuric acid, 20 parts phosphoric acid, and 20 parts water was placed in the cell and the prepared surface was made anode at a potential of 7½ volts for 3 minutes, followed by a potential of 3 volts for 3 more minutes, after which the nickel parts of the surface were covered with a reddish brown film indicated by the dotted line 16, and the solder was covered by the previously described anodic film 15. The solution was then removed from the cell and the anodized surface and interior of the cell were thoroughly rinsed with water. A nickel plating solution was then placed in the cell and provisions were made for maintaining a continuous circulation of the solution through the cell from a larger reservoir, and nickel was deposited onto the prepared surface until the deposit 35 had reached a thickness definitely greater than the thickness of the sheet plus that of the solder. The work was then heated to fuse the solder. The stainless steel backing was then readily removed, leaving the patched sheet in the condition illustrated in Fig. 10, the anodic treatment having left its surface in a condition such that the nickel electrodeposited thereon did not adhere tightly thereto. The patch was then dressed down to the thickness and surface finish of the adjacent parts of the nickel sheet. The patch was then a substantially indistinguishable part of the original sheet as indicated in Fig. 11 wherein the electrodeposited patch 35 and the original sheet 22 are cross hatched in opposite directions, to indicate their distinct origins, but are not separated by any line, thus indicating that they are completely homogeneous and in effect a single piece.

Example 3

In this case separate members 41 and 42 formed of a 16 gage sheet of galvanizing grade ingot iron were embedded in lead 43 with bent over flanges 45 and 46 of the sheet members lying flush with the surface of the lead. Of the entire surface treated, approximately 7 per cent was iron and 93 per cent was lead. This surface, after the known process of cathodic alkaline cleaning was treated as anode in a solution of 60 parts sulfuric acid, 20 parts phosphoric acid, and 20 parts water, at a potential of 7.5 volts, as described, for a time of about 10 minutes. This left the surface of the lead 43 covered with the anodic film 15 as illustrated in Fig. 13. The flanges 45 and 46 on members 41 and 42, being of iron, the reddish brown film 16, found in the previous example, was not formed thereon, the surfaces of flanges 45 and 46 being left exposed by the anodic treatment and in a condition to receive a strongly adherent electrodeposit. It was then thoroughly rinsed with water and iron was electrodeposited thereon in accordance with the process described in my co-pending application for patent, Serial No. 477,131 filed February 25, 1943, now Patent No. 2,420,403, until a deposit 47 of approximately 0.050 inch thickness was secured on each side thereof as illustrated in Fig. 14. Thereafter the lead was melted out leaving a structure formed as illustrated in Fig. 15 of electrolytic iron flanges 47 joined by rolled sheet iron webs and struts 41 and 42. Tests to destruction showed electrolytic iron 47 and bonds between it and the rolled section 45 and 46 to be of such strength that failure took place in the rolled metal itself rather than in the electrolytic metal or the bond.

*Example 4*

The base metal was S. A. E. 4340 steel—a medium carbon low alloy chrome-nickel-molybdenum steel in which none of the alloying elements are present to an extent greater than 2%—hardened and heat-treated to develop maximum toughness and shock resistance. The body on which the deposit is to be made is illustrated in Fig. 16, which shows the steel portion 51 and the solder portions 52, 52. The entire superficial area on which the electrodeposit was to be made was approximately 140 square inches, and of this, 60 square inches or roughly 43% was composed of solder. The solder surfaces composed the major part of one face of the object except for narrow borders 53 and a central strip 54 about ¼ inch in width where the surface was of steel flush with the surface of the solder. The entire object was electrolytically cleaned as cathode in an alkaline solution in a well known manner. After rinsing, it was treated anodically in a concentrated solution of sulfuric and phosphoric acids of the composition previously described, using a potential of 7½ volts for a period of 20 minutes, in the manner hereinbefore described. This treatment left the anodic film 15 (the thickness of which is greatly exaggerated in the drawing in order to render it visible) covering the surface of the solder 52 as illustrated in Fig. 17. The surfaces 53, 54, and 55 of the steel were left without any film and in condition to receive a strongly adherent electrodeposit. The entire object was then rinsed and immediately thereafter it was nickel-plated under conditions adapted to yield a deposit of about 120,000 pounds per square inch tensile strength, until the nickel deposit 57 has reached a thickness of approximately 0.060 inch. The body then appeared (in section) as illustrated in Fig. 18, wherein the electrodeposit 57 is distinguished from the steel base 51 merely by direction of cross hatching and is not separated therefrom by a line. This is done to indicate the fact that the electrodeposit 57 and the steel base 51 are substantially integral and cannot be separated or peeled off as is sometimes the case with common electroplate. The assembly was then heated to about 400° F. until the solder melted and flowed out leaving a large cavity 58 on each side of a central steel partition, as illustrated in Fig. 19 between a relatively heavy steel back and a 0.060 inch thick nickel cover. The structure was then tested to destruction. The steel back and nickel cover were both badly deformed and rupture occurred both in the steel and in the nickel but nowhere in the joint between steel and nickel. The 0.060 inch nickel sheet was completely torn from each side of the strip of nickel which remained firmly adhering to the ¼ inch wide steel surface at 54 which originally separated the two parts of the solder area—showing a conspicuous absence of the usual poisoning effect of the solder on the adjacent surfaces of the base metal.

*Example 5*

The base metal was again S. A. E. 4340 steel. About 6 per cent of the area of the surface to receive the electrodeposit was formed of solder composed of 2 parts lead and 5 parts tin. The anodizing bath was composed of 60 parts sulfuric acid, 20 parts phosphoric acid, and 20 parts water. This bath was maintained at a temperature of 35° to 42° C. A lead cathode was used while the surface to be treated was made anode using an average current density slightly less than 2 amperes per square inch for a period of approximately 10 minutes. Thereafter the part was rinsed and placed in a nickel plating bath and nickel was deposited thereon until base metal and solder were covered with a layer about 0.040 inch thick. The adherence to the base metal was of strength approximately equal to that of the nickel itself and this degree of adherence extended up to the very edge of the solder.

*Example 6*

In this example the base on which the nickel was deposited was S. A. E. 4340 steel, with 6 per cent of the area to be plated composed of solder consisting of 2 parts lead and 5 parts tin. The procedure was the same except that the anodizing bath in this case was composed of 50 parts sulfuric acid, 30 parts phosphoric acid, and 20 parts water. The temperature was maintained between 35° and 47° C. After anodizing, rinsing, and plating with nickel to a thickness of about 0.030 inch, the adherence of the electrodeposited nickel to the steel was found to be approximately equal to the strength of the nickel itself, substantially up to the junction with the solder.

*Example 7*

In this case the base metal was S. A. E. 4340 steel. About 6 per cent of the area of the surface was formed of solder composed of 2 parts lead and 5 parts tin. After a usual cathodic alkaline cleaning operation, the surface, composed partly of steel and partly of solder, was treated anodically in a bath composed of 70 parts sulfuric acid, 30 parts water, and enough orthoboric acid to saturate the bath. The temperature of the bath was 35° to 44° C., the potential 7½ volts, and the average current density was 0.9 ampere per square inch. The anodic treatment was continued for a time of 10 minutes. After removal from the anodizing bath, and without the necessity of preliminary rinsing, nickel was electrodeposited thereon until the deposit had reached a thickness of about 0.035 inch. The deposit was found to adhere to the steel with a strength approximately the strength of the nickel itself.

*Example 8*

In this case the base metal surface was about two-thirds hard electrolytic nickel and one-third solder. The anodic treatment was carried out in a solution composed of 50 parts sulfuric acid, 5 parts phosphoric acid, and 45 parts water. This bath was used at about room temperature with an average current density of about 200 amperes per square foot for about two minutes. After this treatment the surface was rinsed with water and an electrolytic deposit of nickel was made thereon, the application of the plating current being simultaneous with the contact of the surface with the plating bath. When tested the bond between the nickel deposit and the nickel base was found to have substantially the same strength as the nickel itself, up to the junction with the solder. No evidence of the usual poisoning effect of the solder was detected.

These examples show the effectiveness of the process described in promoting strong adherence and preventing the usual poisoning effect of metallic lead or tin as well as of solder, all of which normally cause non-adherence or weak adherence of iron or nickel electrodeposited onto surfaces of nickel or steel when these are adjacent to surfaces composed of the solder, lead, or tin.

I claim:

1. In preparation for the electrodeposition of nickel onto a metallic surface composed in part of solder and part of a metal chosen from the class consisting of steel and nickel, the step of forming on and co-extensive with the surface of the solder, by making the surface anode in a concentrated aqueous solution of sulphuric acid and phosphoric acid an electrically conducting film which is resistant to penetration or removal by the plating solution.

2. In preparation for the electrodeposition of metal onto a metallic surface composed partly of a metal chosen from the class consisting of steel and nickel and partly of solder, the step of anodically forming in a concentrated aqueous solution of sulfuric acid and an acid containing three replaceable hydrogen atoms, chosen from the class consisting of phosphoric acid and boric acid, on and co-extensive with the surface of the solder, an electrically conducting film which is resistant to penetration or removal by the plating solution.

3. In preparation for the electrodeposition of metal onto a metallic surface composed partly of a metal chosen from the class consisting of steel and nickel and partly of solder, the step of anodically forming, in a concentrated aqueous solution of sulfuric and phosphoric acids containing not less than one percent of phosphoric acid, on and co-extensive with the surface of the solder, an electrically conducting film which is resistant to penetration or removal by the plating solution.

4. The method of forming a strongly adherent electrodeposit of a metal chosen from the class consisting of iron and nickel onto the surface of a metal chosen from the class consisting of steel and nickel in the presence of solder, which comprises: completely covering the surface of the solder by anodic treatment of the composite surface, using potential between about 6 and 9 volts, at a temperature between about 30 degrees and 45 degrees C. in a concentrated aqueous solution of sulfuric and phosphoric acids containing not less than one percent of phosphoric acid, with a co-extensive, electrically conducting film which is resistant to penetration or removal by the plating solution; rinsing the parts with water; and thereafter electrolytically depositing said chosen metal over said metallic surface including the film on the solder.

5. The method of preparing the surface, which is liable to poisoning against the reception of an adherent electrodeposit, by the presence of solder thereon, of a metal chosen from the class consisting of steel and nickel for the reception of an adherent electrodeposit of a metal chosen from the class of iron and nickel, which comprises subjecting the surface to treatment as anode in a concentrated aqueous solution of sulfuric acid and an acid containing three replaceable hydrogen atoms, chosen from the class consisting of phosphoric acid and boric acid, under conditions adapted to form an insoluble electrically conducting film over any solder present on said surface.

6. The method of preparing the surface, which is liable to poisoning against the reception of an adherent electrodeposit by the presence of solder thereon, of a metal chosen from the class consisting of steel and nickel for the reception of an adherent electrodeposit of a metal chosen from the class of iron and nickel, which comprises subjecting the surface to treatment as anode in a concentrated aqueous solution of sulfuric and phosphoric acids containing not less than one per cent nor more than about fifty per cent of phosphoric acid, under conditions adapted to form an insoluble electrically conducting film over any solder present on said surface, and thereafter rinsing said surface with water.

7. The method of preparing a nickel surface, which is liable to poisoning against the reception of an adherent electrodeposit by the presence of solder thereon, so that nickel deposited thereon will strongly adhere thereto, which comprises subjecting the nickel surface to treatment as anode in a concentrated aqueous solution of sulfuric and phosphoric acids containing not less than one percent of phosphoric acid, under conditions adapted to form an insoluble electrically conducting film over any solder which may be present on said surface.

8. Method of forming a structure composed in part of steel and in part of electrolytic metal chosen from the class consisting of iron and nickel, wherein said two metals are in contact over only a portion of their adjacent surfaces, which comprises: imparting to the steel the desired form of the steel part of the structure; attaching to the surface of the steel a body of solder of the size and form and in the location of the void desired between the parts of the finished structure; treating the solder-steel surface anodically in a concentrated aqueous solution of sulfuric and phosphoric acids containing not less than one percent of phosphoric acid; rinsing said surface with water; electrodepositing the metal chosen from said class of iron and nickel on the anodically treated surface; and thereafter removing the solder by fusion to leave a void between parts of the surfaces of the steel and of the electrodeposited metal.

9. Process which comprises soldering a stainless steel form onto metal chosen from the class consisting of steel and nickel, anodically treating the composite surface of stainless steel, solder, and the said chosen metal in a concentrated aqueous solution of sulfuric and phosphoric acids containing not less than one percent of phosphoric acid, electrodepositing over said treated surface a metal chosen from the class of iron and nickel, unsoldering the stainless steel form from the said chosen metal and stripping it from the electrodeposit.

10. Method of electrolytically patching holes in sheets formed of metal chosen from the class consisting of steel and nickel, which comprises bevelling the edges of the hole, soldering stainless steel across the bottom, cleaning all solder off that part of the stainless steel exposed through the hole, cleaning the surfaces in and immediately surrounding the hole, treating said surfaces anodically in a concentrated aqueous solution of sulfuric and phosphoric acids containing not less than one percent of phosphoric acid, electrodepositing a metal chosen from the class of iron and nickel over said area to a depth at least as great as the thickness of the sheet, melting the solder, and stripping the stainless steel from the surface of the electrodeposit.

WILLIAM B. STODDARD, Jr.

REFERENCES CITED

The following references are of record in the file of this patent:

UNITED STATES PATENTS

| Number | Name | Date |
|---|---|---|
| 1,455,028 | McCord | May 15, 1923 |
| 1,674,941 | Bart | June 26, 1928 |
| 1,793,936 | Knauss | Feb. 24, 1931 |
| 1,906,376 | Holmes | May 2, 1933 |
| 2,132,438 | Romig | Oct. 11, 1938 |
| 2,299,054 | Harshaw | Oct. 13, 1942 |
| 2,334,699 | Faust | Nov. 23, 1943 |
| 2,457,061 | McQuire | Dec. 21, 1948 |

OTHER REFERENCES

Metal Finishing, pages 306–312, June 1942 (an article by Young et al).

Wein, "Electroforming," Products Finishing, pages 66, 68, August 1945.